United States Patent [19]
Aoki et al.

[11] Patent Number: 5,032,012
[45] Date of Patent: Jul. 16, 1991

[54] REAR CONVERTER LENS SYSTEM

[75] Inventors: Norihiko Aoki; Yuko Kobayashi, both of Tokyo, Japan

[73] Assignee: Olympus Optical Co., Ltd., Tokyo, Japan

[21] Appl. No.: 456,979

[22] Filed: Dec. 26, 1989

[30] Foreign Application Priority Data

Dec. 28, 1988 [JP] Japan .............................. 63-329190

[51] Int. Cl.$^5$ .............................................. G02B 15/08
[52] U.S. Cl. ..................................... 350/422; 350/413
[58] Field of Search ................................ 350/413, 422

[56] References Cited
U.S. PATENT DOCUMENTS 4,830,476 5/1989 Aoki ................................ 350/413 X
4,859,040 8/1989 Kitagishi et al. ..................... 350/413

FOREIGN PATENT DOCUMENTS 58-195817 11/1983 Japan .
61-45207 10/1986 Japan .
61-45208 10/1986 Japan .
63-81312 4/1988 Japan .
63-148222 6/1988 Japan .

Primary Examiner—Scott J. Sugarman
Attorney, Agent, or Firm—Cushman, Darby & Cushman

[57] ABSTRACT

A rear converter lens system comprising, in the order from the object side, a first lens component having positive refractive power and a second lens component having negative refractive power, and having aberrations, especially Petzval's sum and chromatic aberration, corrected favorably by using at least one GRIN lens element in the lens system.

18 Claims, 9 Drawing Sheets

MASTER LENS SYSTEM | 1st LENS COMPONENT | 2nd LENS COMPONENT

MASTER LENS SYSTEM | 1st LENS COMPONENT | 2nd LENS COMPONENT

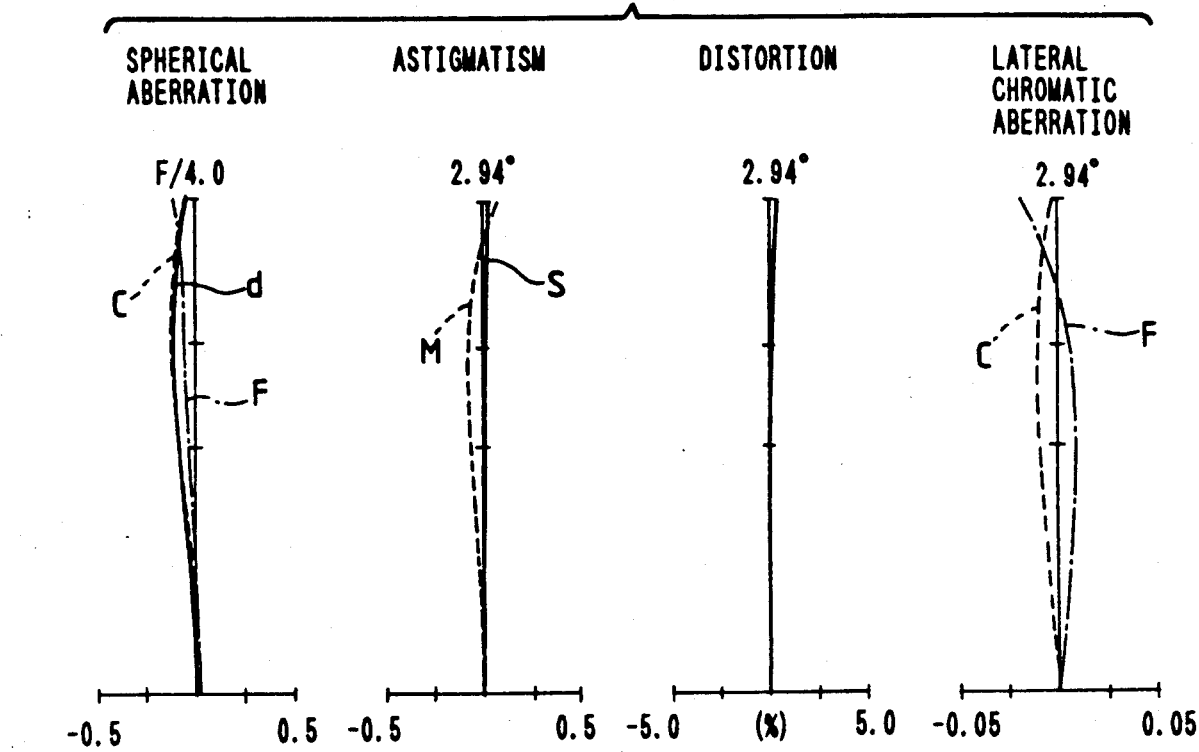
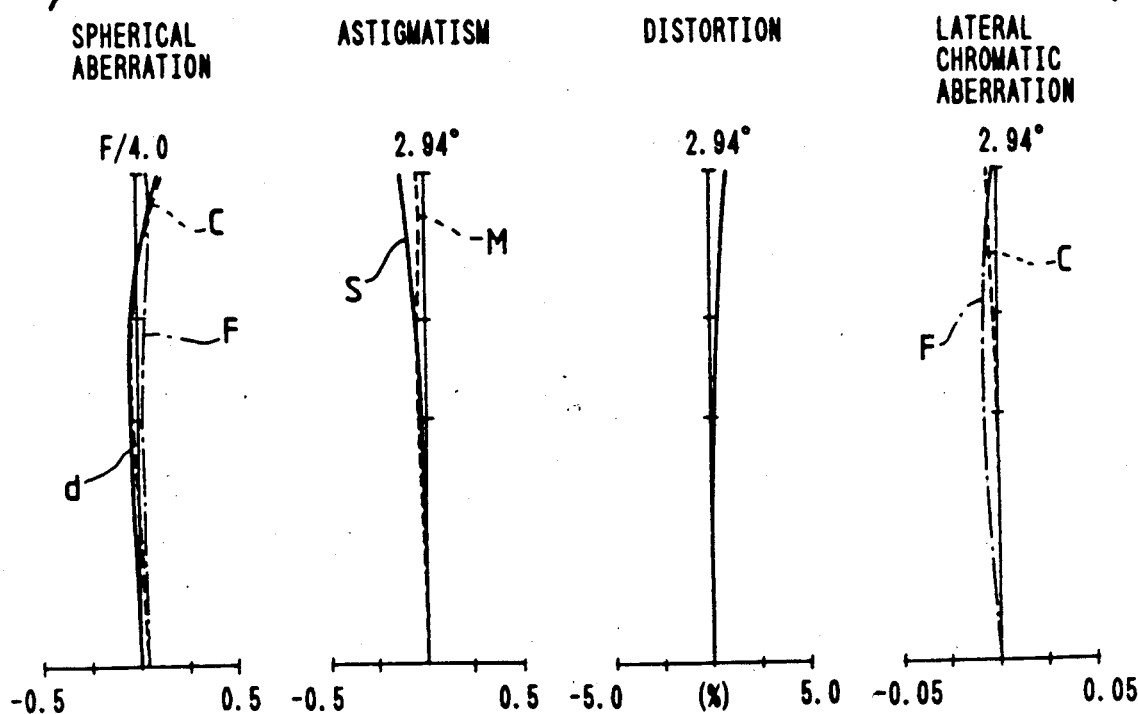

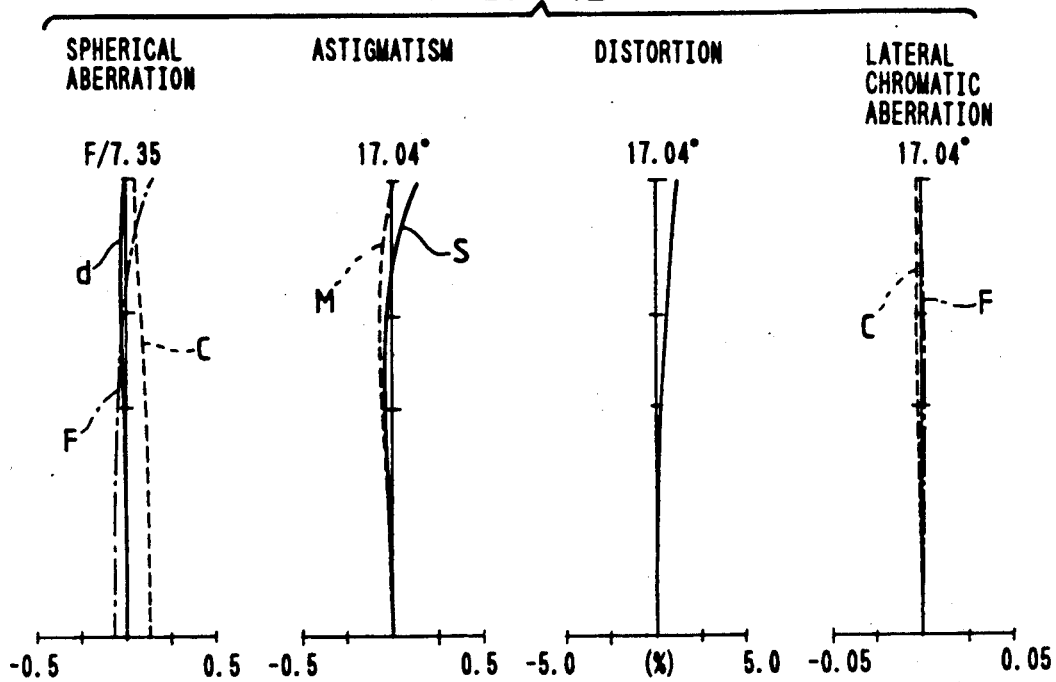
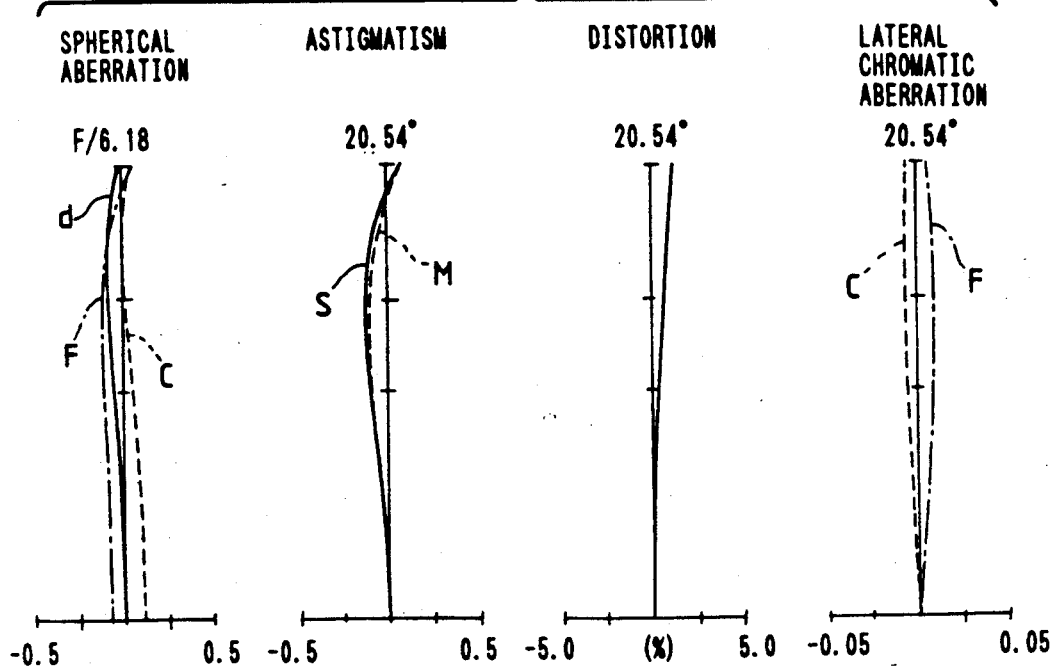

REAR CONVERTER LENS SYSTEM

BACKGROUND OF THE INVENTION (a) Field of the Invention

The present invention relates to a rear converter lens system which is interposed and removed from between a photographic lens system (master lens system) and the image surface formed by said photographic lens system for varying focal length of a photographic optical system.

(b) Description of the Prior Art

In the field of the optical instruments such as cameras, it is known that focal length of a photographic optical system is varied by attaching a converter lens system to a photographic lens system. Since the rear converter lens system which is designed for interposition between the master lens system and the image surface thereof has strongly negative refractive power to obtain a focal length longer than that if the master lens system, the optical system as a whole has a large negative Petzval's sum when the rear converter lens system is attached to the master lens system. In order to prevent aberrations from being varied in the optical system and maintain at a small value the Petzval's sum of the optical system which is apt to be enlarged, the conventional rear converter lens system is composed mostly of approximately five lens components, and has defects that it is large in dimensions and that it requires high manufacturing cost.

As rear converter lens systems developed for correcting these defects, there are known the lens systems disclosed by Japanese Examined Published Patent Application No. 45207/61 and Japanese Unexamined Published Patent Application No. 148222/63. Each of these lens systems is composed of two lens components, i.e., a positive lens component and a negative lens component.

However, each of these lens systems has a large negative Petzval's sum and aberrations which are not corrected sufficiently.

SUMMARY OF THE INVENTION

A primary object of the present invention is to provide a compact rear converter lens system.

Another object of the present invention is to provide a rear converter lens system consisting of a small number of lens elements and having favorably corrected Petzval's sum.

A further object of the present invention is to provide a rear converter lens system having chromatic aberration and other aberrations which are corrected favorably.

The rear converter lens system according to the present invention consists of a first lens component having positive refractive power and a second lens component having negative refractive power which are arranged in the order from the object side, has negative refractive power as a whole and comprises at least one graded refractive index lens (GRIN lens) element.

The rear converter lens system according to the present invention is so designed as to shift the rear principal point thereof toward the object side for minimizing dimensions thereof and is composed, for this purpose, of the first lens component having positive refractive power and the second lens component having negative refractive power. Speaking more detailedly, the extremely image side surface of the first lens component is designed as a surface convex toward the image surface, the extremely object side surface of the second lens component is designed as a surface concave on the object side and the extremely image side surface of the second lens component is designed as a surface convex toward the image surface.

Since the rear converter lens system is arranged between a master lens system and the image surface thereof, the offaxial ray passes only one side of the optical axis in the rear converter lens system, thereby making it necessary to arrange surfaces which have functions to cancel aberrations with one another. For this purpose, it is advantageous for the rear converter lens system to select a surface configuration which is concentrical with regard to a stop. For this reason, the present invention has selected the surface described above configuration for the first and second lens components. In order to impart the required negative refractive power to the rear converter lens system having the composition described above, however, the lens system must have large dimensions. For this reason, the present invention adopts a GRIN lens component in the lens system so as to obtain negative refractive power in addition to the negative refractive power of the surfaces.

The GRIN lens element used in the rear converter lens system according to the present invention is the so-called radial GRIN lens which has refractive index distribution in the direction perpendicular to the optical axis which is expressed by the following formula:

$$n(r) = n_0 + n_1 r^2 + n_2 r^4 + n_3 r^6 + \ldots$$

wherein the reference symbol n represents refractive index of the portion located on the optical axis, the reference symbol r designates distance as measured from the optical axis in the radial direction, the reference symbol n(r) denotes refractive index of the portion located at the distance r from the optical axis, and the reference symbols $n_1$, $n_2$ . . . represent the refractive index distribution coefficients.

Further, it is desirable for the rear converter lens system according to the present invention to use a GRIN lens element satisfying the following condition (1) in the second lens component having negative refractive power:

$$0 < n_{1(2)}\{1/_{(mm)}{}^2\} \tag{1}$$

wherein the reference symbol $n_{2(2)}$ represents the refractive index distribution coefficients n for the d-line in the formula of refractive index distribution for the GRIN lens element used in the second lens component.

The medium of the GRIN lens element satisfying the above-mentioned condition (1) has negative refractive power. As a result, it is possible to share the negative refractive power with the medium of the GRIN lens element while keeping the surface configuration of the surfaces of the second lens component concentric with regard to the stop. Accordingly, it is possible to select the desired negative refractive power for the second lens component, thereby accomplishing the correction of the offaxial aberrations and compact design of the rear converter lens system.

Furthermore, it is desirable for the rear converter lens system according to the present invention to satisfy the following condition (2):

$$f^2 \cdot n_{1(2)} < 75 \tag{2}$$

wherein the reference symbol f represents focal length of the rear converter lens system.

If the upper limit of the condition (2) is exceeded, the GRIN lens element will have too high a refractive index gradient and can hardly be manufactured in practice.

Since the rear converter lens system itself has the strongly negative refractive power as described above, the optical system has a large negative Petzval's sum when the rear converter lens system is combined with a master lens system. The present invention has succeeded in correcting this Petzval's sum by using the GRIN lens element in the second lens component.

In order to correct chromatic aberration, it is necessary to use a glass material which has a low refractive index and a small Abbe's number for the positive lens component, and a glass material which has a high refractive index and a large Abbe's number for the negative lens component. In order to correct the other aberrations additionally, a rear converter lens system generally uses a large number of lens components.

Petzval's sum of a lens system consisting only of homogenous lens elements is expressed by the following formula:

$$\Sigma(\phi_s/n_0)$$

wherein the reference symbol $\phi_s$ represents refractive power of surface and the reference symbol $n_0$ designates refractive index on the optical axis.

On the other hand, Petzval's sum of a GRIN lens element is expressed by the following formula:

$$\Sigma(\phi_s/n_0) + \Sigma(\phi_M/n_0^2)$$

wherein the reference symbol $\phi_M$ represents refractive power of medium.

Therefore, it is possible for the radial GRIN lens element to correct Petzval's sum by the medium thereof. Especially when the refractive power of the surface and refractive power of the medium have the same sign or when refractive power of the surface is weak and refractive power of the lens component is occupied mostly by refractive power of the medium, it is possible for a lens component comprising the radial GRIN lens element to obtain a Petzval's sum far smaller than that of a lens component comprising a homogenous lens element having the same refractive power as that of the radial GRIN lens element.

Since the second lens component having the especially strong negative refractive power has the surface configuration concentral with regard to the stop in the rear converter lens system according to the present invention, most of the negative refractive power is occupied by the medium of the radial GRIN lens element. As a result, the radial GRIN lens element makes it possible to obtain Petzval's sum of the second lens component, which is apt to have a large negative value, far smaller than that of the second lens component when it comprises a homogenous lens element.

It is further desirable for the rear converter lens system according to the present invention to satisfy the following conditions (3) and (4):

$$0.05 < \phi_M/\phi_2 < 3 \tag{3}$$

$$0.3 < r_F(2)/r_{R(2)} < 3 \tag{4}$$

wherein the reference symbol $\phi_M$ represents refractive power of the medium of the radial GRIN lens element used in the second lens component, the reference symbol $\phi_2$ designates refractive power of the second lens component, the reference symbol $r_{F(2)}$ denotes radius of curvature on the extremely object side surface of the second lens component and the reference symbol $r_{R(2)}$ represents radius of curvature on the extremely image side surface of the second lens component.

The condition (3) defines the refractive power of medium of the radial GRIN lens element used in the second lens component. If the refractive power of the medium is weak enough to exceed the lower limit of 0.05 of the condition (3), the refractive power of the surface must be strengthened to obtain the refractive power required for the second lens component, thereby making it difficult to reduce Petzval's sum. If the upper limit of 3 of the condition (3) is exceeded, the radial GRIN lens will have too high a refractive index gradient and can hardly be manufactured.

The condition (4) defines symmetry in the surface configuration of the second lens component with regard to the stop. If the upper limit of 3 or the lower limit of 0.3 of the condition (4) is exceeded, the symmetry of the second lens component will be degraded, thereby making it difficult to correct the offaxial aberrations.

When a rear converter lens system consists of a small number of homogenous lens elements only, it is difficult to correct not only Petzval's sum but also chromatic aberration.

When a radial GRIN lens element is used as in the case of the rear converter lens system according to the present invention, it is possible to correct chromatic aberration with a small number of lens elements.

The radial GRIN lens element can correct chromatic aberration in itself when it is designed so as to have refractive index distribution different at individual wavelengths.

The condition for correcting the paraxial chromatic aberration in the radial GRIN lens element itself can be expressed as follows:

$$(\phi_s/\nu_{0d}) + (\phi_M/\nu_{1d}) = 0$$

wherein $\nu_{0d}$ represents a value which is determined by the following formula when refractive indices for the d-line, C-line and F-line on the optical axis are represented by $n_{0d}$, $n_{0C}$ and $n_{0F}$ respectively:

$$\nu_{0d} = (n_{0d} - 1)/(n_{0F} - n_{0C})$$

and the reference symbol $\nu_{1d}$ designates a value which is determined by the following formula when the coefficients of the second order in the refractive index distribution formula for the d-line, C-line and F-line are represented by $n_{1d}$, $n_{1C}$ and $n_{1F}$ respectively:

$$\nu_{1d} = n_{1d}/(n_{1F} - n_{1c})$$

As is understood from the foregoing description, the radial GRIN lens elements enhances flexibility in correction of chromatic aberration in itself since it permits controlling not only Abbe's number considered for the homogenous lens element but also the above-mentioned factor $\nu_{1d}$, and can zero the longitudinal chromatic aberration also in itself by varying refractive index distributions at the individual wavelengths.

In the rear converter lens system according to the present invention, it is desirable for correcting chromatic aberration to design the radial GRIN lens element used in the second lens component in such a manner that it satisfies the following condition (5):

$$n_{1C}\{1/(mm)^2\} < n_{1F}\{1/(mm)^2\} \tag{5}$$

When the condition (5) is satisfied, i.e., when a radial GRIN lens having refractive index gradients higher at short wavelengths than those at long wavelengths is used in the second lens component of the rear converter lens system according to the present invention, it is possible to obtain a lens system which has chromatic aberration favorably corrected with a small number of lens elements.

BRIEF DESCRIPTION OF THE DRAWINGS

FIG. 9 through FIG. 16 shows graphs illustrating aberration characteristics of the Embodiments 1 through 8 respectively of the present invention;

DETAILED DESCRIPTION OF THE PREFERRED EMBODIMENTS

Figure 1:
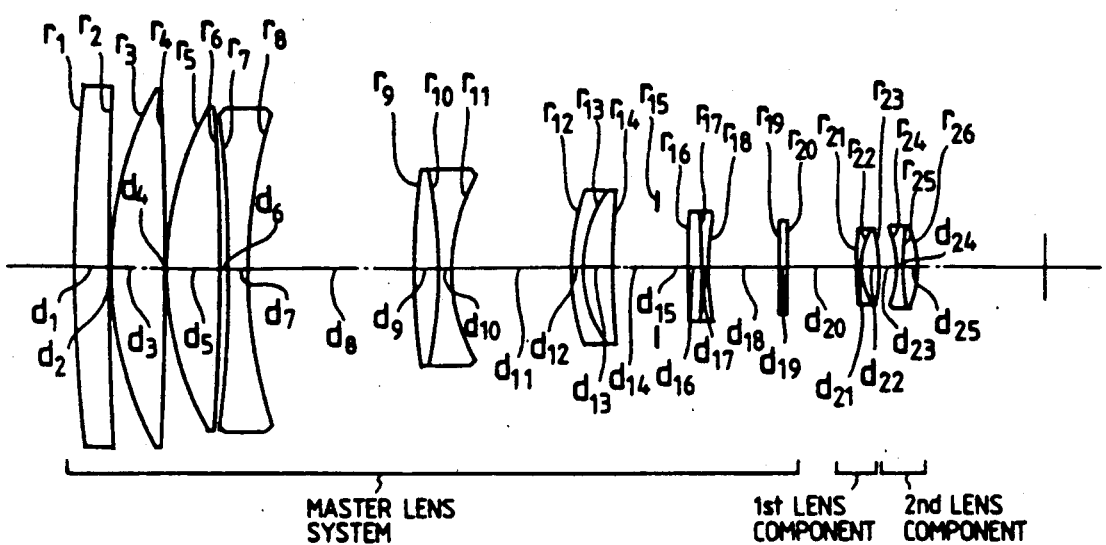
FIG. 1 through FIG. 8 show sectional views illustrating compositions of Embodiments 1 through 8 of the rear converter lens system according to the present invention.
Figure 2:
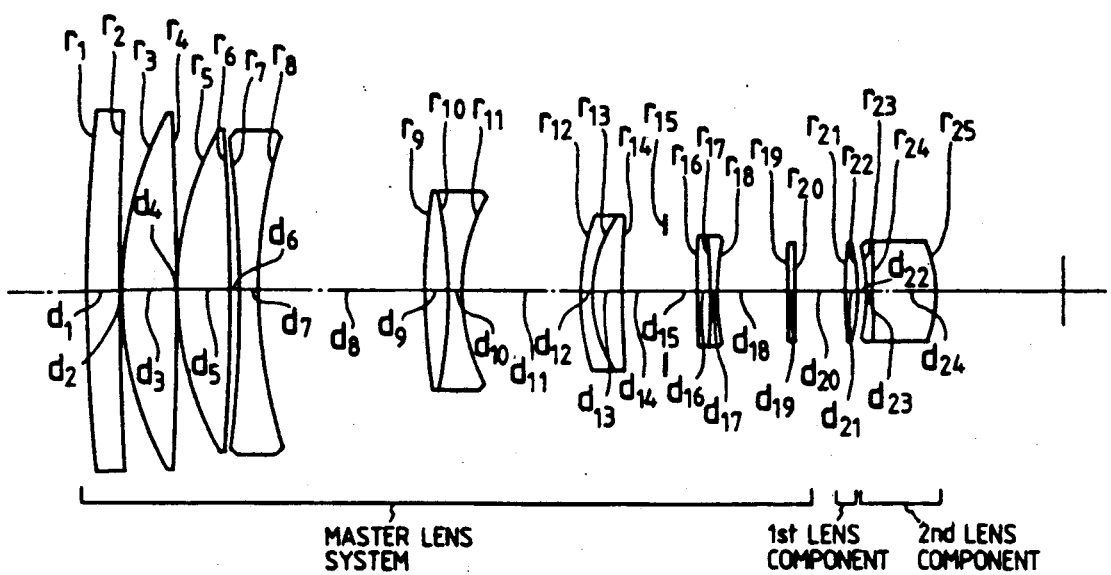
Figure 3:
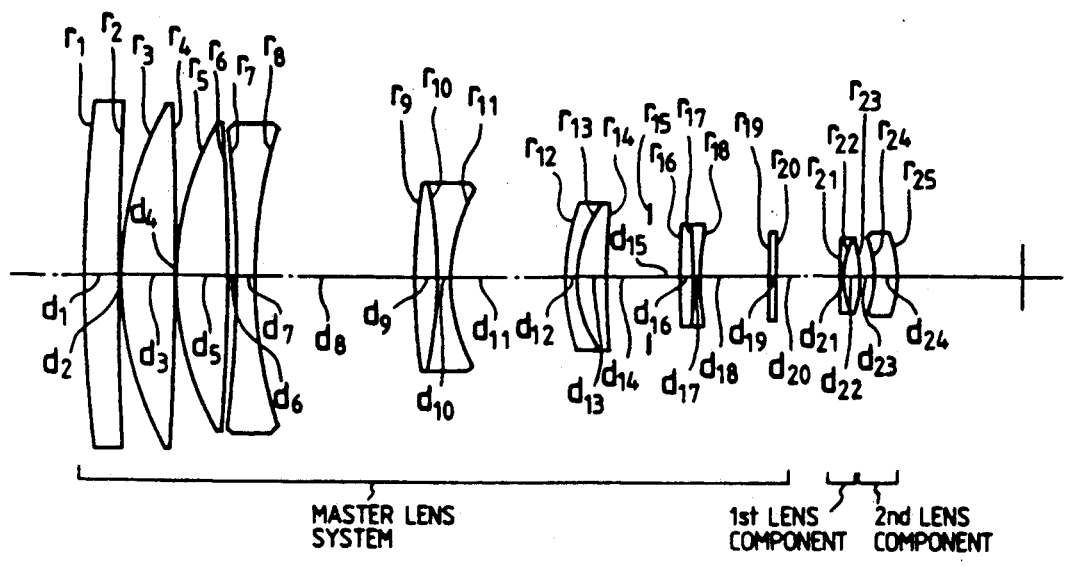
Figure 4:
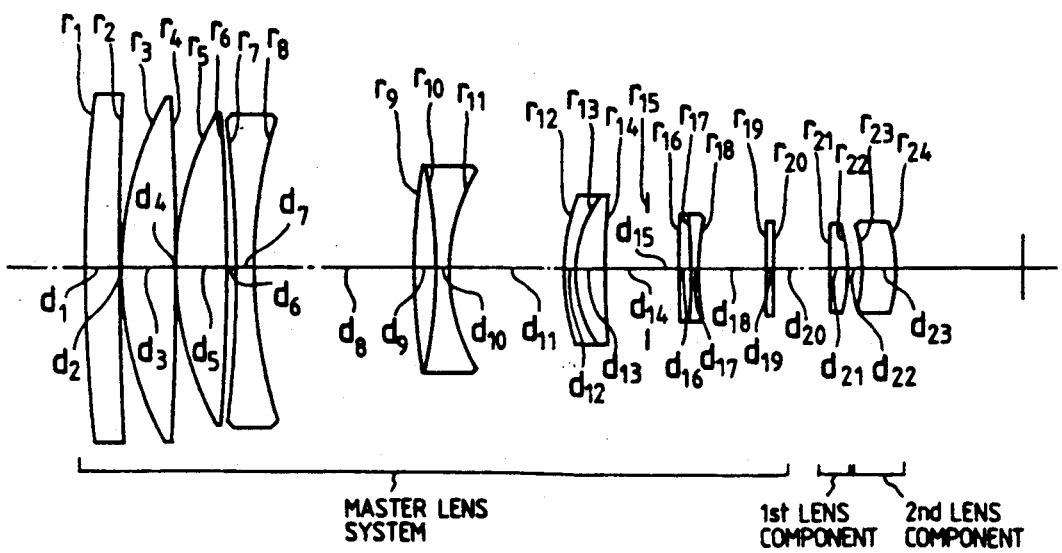
Figure 5:
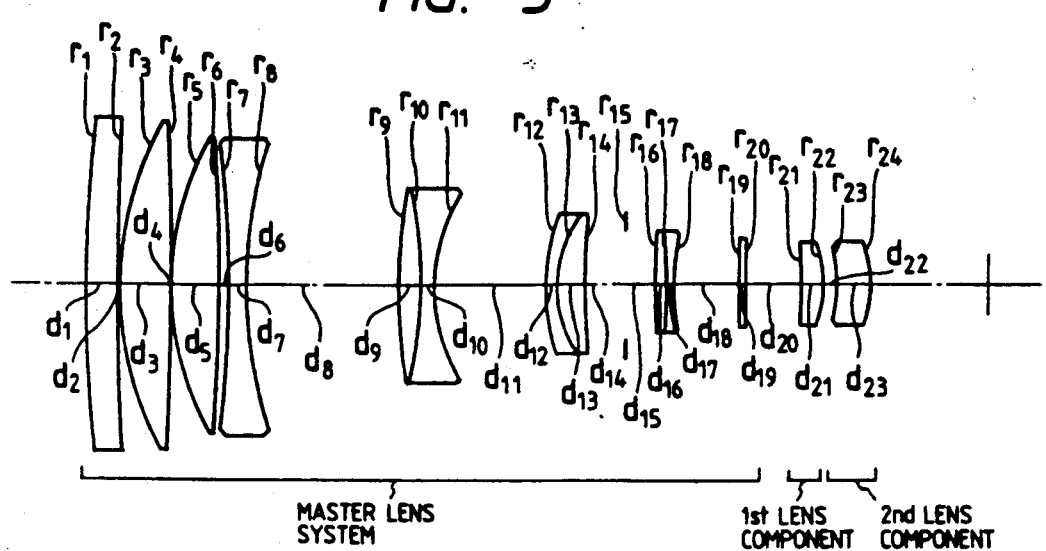

Now, the present invention will be described more detailedly below with reference to the preferred Embodiments of the rear converter lens system illustrated in the accompanying drawings and given in the form of the following numerical data:

Embodiment 1
f = 420.0 mm, F/4.0, 2ω = 5.9°
magnification 1.4

$r_1 = 499.7880$
$d_1 = 10.3200$  $n_{01} = 1.51633$  $\nu_{01} = 64.15$
$r_2 = 1082.1660$
$d_2 = 0.5100$
$r_3 = 110.0790$
$d_3 = 17.0100$  $n_{02} = 1.49700$  $\nu_{02} = 81.61$
$r_4 = -988.8450$
$d_4 = 0.5100$
$r_5 = 101.1600$
$d_5 = 16.2900$  $n_{03} = 1.43425$  $\nu_{03} = 95.00$
$r_6 = -531.6420$
$d_6 = 2.1000$
$r_7 = -419.6400$
$d_7 = 6.1800$  $n_{04} = 1.83400$  $\nu_{04} = 37.16$
$r_8 = 168.1800$
$d_8 = 49.4970$
$r_9 = 238.9830$
$d_9 = 7.2300$  $n_{05} = 1.80518$  $\nu_{05} = 25.43$
$r_{10} = -142.9350$
$d_{10} = 3.8100$  $n_{06} = 1.61340$  $\nu_{06} = 43.84$
$r_{11} = 56.8500$
$d_{11} = 36.6420$
$r_{12} = 71.6160$
$d_{12} = 3.6000$  $n_{07} = 1.74400$  $\nu_{07} = 44.73$
$r_{13} = 38.6070$
$d_{13} = 9.2700$  $n_{08} = 1.61700$  $\nu_{08} = 62.79$
$r_{14} = 273.2700$
$d_{14} = 13.4130$
$r_{15} = \infty$ (stop)
$d_{15} = 9.4500$
$r_{16} = 579.9780$
$d_{16} = 4.1100$  $n_{09} = 1.70154$  $\nu_{09} = 41.24$
$r_{17} = -218.5950$
$d_{17} = 2.0700$  $n_{010} = 1.51742$  $\nu_{010} = 52.41$
$r_{18} = 103.8180$
$d_{18} = 21.1200$
$r_{19} = \infty$
$d_{19} = 2.5800$  $n_{011} = 1.51633$  $\nu_{011} = 64.15$
$r_{20} = \infty$
$d_{20} = 20.5053$
$r_{21} = 151.0997$
$d_{21} = 1.4105$  $n_{012} = 1.83481$  $\nu_{012} = 42.72$ -continued
Embodiment 1
f = 420.0 mm, F/4.0, 2ω = 5.9°
magnification 1.4

$r_{22} = 21.4545$
$d_{22} = 5.2261$  $n_{013} = 1.62004$  $\nu_{013} = 36.25$
$r_{23} = -56.4725$
$d_{23} = 5.3612$
$r_{24} = -28.6868$
$d_{24} = 1.8135$  $n_{014} = 1.81600$  $\nu_{014} = 46.62$
$r_{25} = 102.3333$
$d_{25} = 4.4264$ (graded refractive index lens)
$r_{26} = -32.5060$ graded refractive index lens

|  | $n_0$ | $n_1$ |
|---|---|---|
| d-line | 1.53172, | $0.26268 \times 10^{-3}$ |
| C-line | 1.52845, | $0.25772 \times 10^{-3}$ |
| F-line | 1.53933, | $0.27425 \times 10^{-3}$ |
|  | $n_2$ | $n_3$ |
| d-line | $0.56974 \times 10^{-7}$, | $0.12086 \times 10^{-9}$ |
| C-line | $0.69292 \times 10^{-7}$, | $0.54286 \times 10^{-10}$ |
| F-line | $0.28232 \times 10^{-7}$, | $0.27620 \times 10^{-9}$ |

$\phi M/\phi_2 = 1.55 \times 10^{-1}$,  $r_{F(2)}/r_{R(2)} = 8.83 \times 10^{-1}$
$f^2 \cdot n_{1(2)} = 3.4171$

Embodiment 2
f = 420.0 mm, F/4.0, 2ω = 5.9°
magnification 1.4

$r_1 = 499.7880$
$d_1 = 10.3200$  $n_{01} = 1.51633$  $\nu_{01} = 64.15$
$r_2 = 1082.1660$
$d_2 = 0.5100$
$r_3 = 110.0790$
$d_3 = 17.0100$  $n_{02} = 1.49700$  $\nu_{02} = 81.61$
$r_4 = -988.8450$
$d_4 = 0.5100$
$r_5 = 101.1600$
$d_5 = 16.2900$  $n_{03} = 1.43425$  $\nu_{03} = 95.00$
$r_6 = -531.6420$
$d_6 = 2.1000$
$r_7 = -419.6400$
$d_7 = 6.1800$  $n_{04} = 1.83400$  $\nu_{04} = 37.16$
$r_8 = 168.1800$
$d_8 = 49.4970$
$r_9 = 238.9830$
$d_9 = 7.2300$  $n_{05} = 1.80518$  $\nu_{05} = 25.43$
$r_{10} = -142.9350$
$d_{10} = 3.8100$  $n_{06} = 1.61340$  $\nu_{06} = 43.84$
$r_{11} = 56.8500$
$d_{11} = 36.6420$
$r_{12} = 71.6160$
$d_{12} = 3.6000$  $n_{07} = 1.74400$  $\nu_{07} = 44.73$
$r_{13} = 38.6070$
$d_{13} = 9.2700$  $n_{08} = 1.61700$  $\nu_{08} = 62.79$
$r_{14} = 273.2700$
$d_{14} = 13.4130$
$r_{15} = \infty$ (stop)
$d_{15} = 9.4500$
$r_{16} = 579.9780$
$d_{16} = 4.1100$  $n_{09} = 1.70154$  $\nu_{09} = 41.24$
$r_{17} = -218.5950$
$d_{17} = 2.0700$  $n_{010} = 1.51742$  $\nu_{010} = 52.41$
$r_{18} = 103.8180$
$d_{18} = 21.1200$
$r_{19} = \infty$
$d_{19} = 2.5800$  $n_{011} = 1.51633$  $\nu_{011} = 64.15$
$r_{20} = \infty$
$d_{20} = 14.6134$
$r_{21} = 124.1288$
$d_{21} = 4.0069$  $n_{012} = 1.62004$  $\nu_{012} = 36.25$
$r_{22} = -53.9807$
$d_{22} = 2.4637$
$r_{23} = -57.5027$
$d_{23} = 1.7140$  $n_{013} = 1.81600$  $\nu_{013} = 46.62$
$r_{24} = 410.5274$
$d_{24} = 18.6674$ (graded refractive index lens)
$r_{25} = -39.5169$ graded refractive index lens

-continued

Embodiment 2
f = 420.0 mm, F/4.0, 2ω = 5.9°
magnification 1.4

|  | $n_0$ | $n_1$ |
|---|---|---|
| d-line | 1.53172, | $0.69109 \times 10^{-3}$ |
| C-line | 1.52845, | $0.68728 \times 10^{-3}$ |
| F-line | 1.53933, | $0.69998 \times 10^{-3}$ |
|  | $n_2$ | $n_3$ |
| d-line | $0.62222 \times 10^{-6}$, | $0.76115 \times 10^{-9}$ |
| C-line | $0.61414 \times 10^{-6}$, | $0.75502 \times 10^{-9}$ |
| F-line | $0.64107 \times 10^{-6}$, | $0.77545 \times 10^{-9}$ |

$\phi_M/\phi_2 = 9.92 \times 10^{-1}$, $r_{F(2)}/r_{R(2)} = 1.46$
$f^2 \cdot n_{1(2)} = 9.1448$

Embodiment 3
f = 419.9 mm, F/4.0, 2ω = 5.9°
magnification 1.4

| $r_1 = 499.7880$ | | | |
| --- | --- | --- | --- |
|  | $d_1 = 10.3200$ | $n_{01} = 1.51633$ | $\nu_{01} = 64.15$ |
| $r_2 = 1082.1660$ | | | |
|  | $d_2 = 0.5100$ | | |
| $r_3 = 110.0790$ | | | |
|  | $d_3 = 17.0100$ | $n_{02} = 1.49700$ | $\nu_{02} = 81.61$ |
| $r_4 = -988.8450$ | | | |
|  | $d_4 = 0.5100$ | | |
| $r_5 = 101.1600$ | | | |
|  | $d_5 = 16.2900$ | $n_{03} = 1.43425$ | $\nu_{03} = 95.00$ |
| $r_6 = -531.6420$ | | | |
|  | $d_6 = 2.1000$ | | |
| $r_7 = -419.6400$ | | | |
|  | $d_7 = 6.1800$ | $n_{04} = 1.83400$ | $\nu_{04} = 37.16$ |
| $r_8 = 168.1800$ | | | |
|  | $d_8 = 49.4970$ | | |
| $r_9 = 238.9830$ | | | |
|  | $d_9 = 7.2300$ | $n_{05} = 1.80518$ | $\nu_{06} = 25.43$ |
| $r_{10} = -142.9350$ | | | |
|  | $d_{10} = 3.8100$ | $n_{06} = 1.61340$ | $\nu_{06} = 43.84$ |
| $r_{11} = 56.8500$ | | | |
|  | $d_{11} = 36.6420$ | | |
| $r_{12} = 71.6160$ | | | |
|  | $d_{12} = 3.6000$ | $n_{07} = 1.74400$ | $\nu_{07} = 44.73$ |
| $r_{13} = 38.6070$ | | | |
|  | $d_{13} = 9.2700$ | $n_{08} = 1.61700$ | $\nu_{08} = 62.79$ |
| $r_{14} = 273.2700$ | | | |
|  | $d_{14} = 13.4130$ | | |
| $r_{15} = \infty$ (stop) | | | |
|  | $d_{15} = 9.4500$ | | |
| $r_{16} = 579.9780$ | | | |
|  | $d_{16} = 4.1100$ | $n_{09} = 1.70154$ | $\nu_{09} = 41.24$ |
| $r_{17} = -218.5950$ | | | |
|  | $d_{17} = 2.0700$ | $n_{010} = 1.51742$ | $\nu_{010} = 52.41$ |
| $r_{18} = 103.8180$ | | | |
|  | $d_{18} = 21.1200$ | | |
| $r_{19} = \infty$ | | | |
|  | $d_{19} = 2.5800$ | $n_{011} = 1.51633$ | $\nu_{011} = 64.15$ |
| $r_{20} = \infty$ | | | |
|  | $d_{20} = 19.9398$ | | |
| $r_{21} = -769.5369$ | | | |
|  | $d_{21} = 1.2035$ | $n_{012} = 1.83481$ | $\nu_{012} = 42.72$ |
| $r_{22} = 33.0094$ | | | |
|  | $d_{22} = 5.0013$ | $n_{013} = 1.62004$ | $\nu_{013} = 36.25$ |
| $r_{23} = -39.2346$ | | | |
|  | $d_{23} = 4.5181$ | | |
| $r_{24} = -33.5300$ | | | |
|  | $d_{24} = 7.1833$ (graded refractive index lens) | | |
| $r_{25} = -38.5432$ | | | | graded refractive index lens

|  | $n_0$ | $n_1$ |
|---|---|---|
| d-line | 1.53113, | $0.11216 \times 10^{-2}$ |
| C-line | 1.52852, | $0.11121 \times 10^{-2}$ |
| F-line | 1.53703, | $0.11438 \times 10^{-2}$ |
|  | $n_2$ | $n_3$ |
| d-line | $-0.17269 \times 10^{-6}$, | $0.13165 \times 10^{-9}$ |
| C-line | $-0.16665 \times 10^{-6}$, | $0.16460 \times 10^{-9}$ |
| F-line | $-0.18678 \times 10^{-6}$, | $0.54764 \times 10^{-10}$ |

$\phi_M/\phi_2 = 9.48 \times 10^{-1}$, $r_{F(2)}/r_{R(2)} = 8.70 \times 10^{-1}$

-continued

Embodiment 3
f = 419.9 mm, F/4.0, 2ω = 5.9°
magnification 1.4

$f^2 \cdot n_{1(2)} = 14.4508$

Embodiment 4
f = 420.0 mm, F/4.0, 2ω = 5.9°
magnification 1.4

| $r_1 = 499.7880$ | | | |
| --- | --- | --- | --- |
|  | $d_1 = 10.3200$ | $n_{01} = 1.51633$ | $\nu_{01} = 64.15$ |
| $r_2 = 1082.1660$ | | | |
|  | $d_2 = 0.5100$ | | |
| $r_3 = 110.0790$ | | | |
|  | $d_3 = 17.0100$ | $n_{02} = 1.49700$ | $\nu_{02} = 81.61$ |
| $r_4 = -988.8450$ | | | |
|  | $d_4 = 0.5100$ | | |
| $r_5 = 101.1600$ | | | |
|  | $d_5 = 16.2900$ | $n_{03} = 1.43425$ | $\nu_{03} = 95.00$ |
| $r_6 = -531.6420$ | | | |
|  | $d_6 = 2.1000$ | | |
| $r_7 = -419.6400$ | | | |
|  | $d_7 = 6.1800$ | $n_{04} = 1.83400$ | $\nu_{04} = 37.16$ |
| $r_8 = 168.1800$ | | | |
|  | $d_8 = 49.4970$ | | |
| $r_9 = 238.9830$ | | | |
|  | $d_9 = 7.2300$ | $n_{05} = 1.80518$ | $\nu_{05} = 25.43$ |
| $r_{10} = -142.9350$ | | | |
|  | $d_{10} = 3.8100$ | $n_{06} = 1.61340$ | $\nu_{06} = 43.84$ |
| $r_{11} = 56.8500$ | | | |
|  | $d_{11} = 36.6420$ | | |
| $r_{12} = 71.6160$ | | | |
|  | $d_{12} = 3.6000$ | $n_{07} = 1.74400$ | $\nu_{07} = 44.73$ |
| $r_{13} = 38.6070$ | | | |
|  | $d_{13} = 9.2700$ | $n_{08} = 1.61700$ | $\nu_{08} = 62.79$ |
| $r_{14} = 273.2700$ | | | |
|  | $d_{14} = 13.4130$ | | |
| $r_{15} = \infty$ (stop) | | | |
|  | $d_{15} = 9.4500$ | | |
| $r_{16} = 579.9780$ | | | |
|  | $d_{16} = 4.1100$ | $n_{09} = 1.70154$ | $\nu_{09} = 41.24$ |
| $r_{17} = -218.5950$ | | | |
|  | $d_{17} = 2.0700$ | $n_{010} = 1.51742$ | $\nu_{010} = 52.41$ |
| $r_{18} = 103.8180$ | | | |
|  | $d_{18} = 21.1200$ | | |
| $r_{19} = \infty$ | | | |
|  | $d_{19} = 2.5800$ | $n_{011} = 1.51633$ | $\nu_{011} = 64.15$ |
| $r_{20} = \infty$ | | | |
|  | $d_{20} = 17.5592$ | | |
| $r_{21} = 57880.5379$ | | | |
|  | $d_{21} = 5.6747$ (graded refractive index lens 1) | | |
| $r_{22} = -48.3800$ | | | |
|  | $d_{22} = 4.3126$ | | |
| $r_{23} = -49.4797$ | | | |
|  | $d_{23} = 10.7870$ (graded refractive index lens 2) | | |
| $r_{24} = -44.2961$ | | | | graded refractive index lens 1

|  | $n_0$ | $n_1$ |
|---|---|---|
| d-line | 1.53172, | $0.14644 \times 10^{-3}$ |
| C-line | 1.52845, | $0.14283 \times 10^{-3}$ |
| F-line | 1.53933, | $0.15486 \times 10^{-3}$ |
|  | $n_2$ | $n_3$ |
| d-line | $-0.24906 \times 10^{-7}$, | $0.14868 \times 10^{-9}$ |
| C-line | $-0.24680 \times 10^{-7}$, | $0.20531 \times 10^{-9}$ |
| F-line | $-0.25433 \times 10^{-7}$, | $0.16547 \times 10^{-10}$ | graded refractive index lens 2

|  | $n_0$ | $n_1$ |
|---|---|---|
| d-line | 1.65844, | $0.97839 \times 10^{-3}$ |
| C-line | 1.65456, | $0.97716 \times 10^{-3}$ |
| F-line | 1.66750, | $0.98125 \times 10^{-3}$ |
|  | $n_2$ | $n_3$ |
| d-line | $0.48939 \times 10^{-6}$, | $0.24432 \times 10^{-9}$ |
| C-line | $0.47850 \times 10^{-6}$, | $0.23871 \times 10^{-9}$ |
| F-line | $0.51479 \times 10^{-6}$, | $0.25740 \times 10^{-9}$ |

$\phi_M/\phi_2 = 1.11$, $r_{F(2)}/r_{R(2)} = 1.12$
$f^2 \cdot n_{1(2)} = 12.5657$

Embodiment 5
$f = 420.0$ mm, F/4.0, $2\omega = 5.9°$
magnification 1.4

| | | | |
|---|---|---|---|
| $r_1 = 499.7880$ | | | |
| | $d_1 = 10.3200$ | $n_{01} = 1.51633$ | $\nu_{01} = 64.15$ |
| $r_2 = 1082.1660$ | | | |
| | $d_2 = 0.5100$ | | |
| $r_3 = 110.0790$ | | | |
| | $d_3 = 17.0100$ | $n_{02} = 1.49700$ | $\nu_{02} = 81.61$ |
| $r_4 = -988.8450$ | | | |
| | $d_4 = 0.5100$ | | |
| $r_5 = 101.1600$ | | | |
| | $d_5 = 16.2900$ | $n_{03} = 1.43425$ | $\nu_{03} = 95.00$ |
| $r_6 = -531.6420$ | | | |
| | $d_6 = 2.1000$ | | |
| $r_7 = -419.6400$ | | | |
| | $d_7 = 6.1800$ | $n_{04} = 1.83400$ | $\nu_{04} = 37.16$ |
| $r_8 = 168.1800$ | | | |
| | $d_8 = 49.4970$ | | |
| $r_9 = 238.9830$ | | | |
| | $d_9 = 7.2300$ | $n_{05} = 1.80518$ | $\nu_{05} = 25.43$ |
| $r_{10} = -142.9350$ | | | |
| | $d_{10} = 3.8100$ | $n_{06} = 1.61340$ | $\nu_{06} = 43.84$ |
| $r_{11} = 56.8500$ | | | |
| | $d_{11} = 36.6420$ | | |
| $r_{12} = 71.6160$ | | | |
| | $d_{12} = 3.6000$ | $n_{07} = 1.74400$ | $\nu_{07} = 44.73$ |
| $r_{13} = 38.6070$ | | | |
| | $d_{13} = 9.2700$ | $n_{08} = 1.61700$ | $\nu_{08} = 62.79$ |
| $r_{14} = 273.2700$ | | | |
| | $d_{14} = 13.4130$ | | |
| $r_{15} = \infty$ (stop) | | | |
| | $d_{15} = 9.4500$ | | |
| $r_{16} = 579.9780$ | | | |
| | $d_{16} = 4.1100$ | $n_{09} = 1.70154$ | $\nu_{09} = 41.24$ |
| $r_{17} = -218.5950$ | | | |
| | $d_{17} = 2.0700$ | $n_{010} = 1.51742$ | $\nu_{010} = 52.41$ |
| $r_{18} = 103.8180$ | | | |
| | $d_{18} = 21.1200$ | | |
| $r_{19} = \infty$ | | | |
| | $d_{19} = 2.5800$ | $n_{011} = 1.51633$ | $\nu_{011} = 64.15$ |
| $r_{20} = \infty$ | | | |
| | $d_{20} = 17.8238$ | | |
| $r_{21} = -181.9919$ | | | |
| | $d_{21} = 7.0676$ | $n_{012} = 1.53256$ | $\nu_{012} = 45.91$ |
| $r_{22} = -42.1108$ | | | |
| | $d_{22} = 4.3117$ | | |
| $r_{23} = -55.6976$ | | | |
| | $d_{23} = 10.8125$ (graded refractive index lens) | | |
| $r_{24} = -44.5262$ | | | | graded refractive index lens

| | $n_0$ | $n_1$ |
|---|---|---|
| d-line | 1.65844, | $0.10667 \times 10^{-2}$ |
| C-line | 1.65455, | $0.10630 \times 10^{-2}$ |
| F-line | 1.66750, | $0.10753 \times 10^{-2}$ |
| | $n_2$ | $n_3$ |
| d-line | $0.47053 \times 10^{-6}$, | $0.43497 \times 10^{-9}$ |
| C-line | $0.45239 \times 10^{-6}$, | $0.48092 \times 10^{-9}$ |
| F-line | $0.51285 \times 10^{-6}$, | $0.32775 \times 10^{-9}$ |

$\phi_M/\phi_2 = 1.21$, $\quad r_{F(2)}/r_{R(2)} = 1.25$
$f^2 \cdot n_{1(2)} = 12.9929$

Embodiment 6
$f = 68.2$ mm, F/7.3, $2\omega = 35.1°$
magnification 2.0

| | | | |
|---|---|---|---|
| $r_1 = 10.3851$ | | | |
| | $d_1 = 4.2962$ | $n_{01} = 1.73400$ | $\nu_{01} = 51.49$ |
| $r_2 = 26.4561$ | | | |
| | $d_2 = 0.6535$ | | |
| $r_3 = -36.7727$ | | | |
| | $d_3 = 0.8044$ | $n_{02} = 1.68893$ | $\nu_{02} = 31.08$ |
| $r_4 = 11.1146$ | | | |
| | $d_4 = 1.4081$ | | |
| $r_5 = 39.3259$ | | | |
| | $d_5 = 1.5082$ | $n_{03} = 1.79952$ | $\nu_{03} = 42.24$ |
| $r_6 = -22.4415$ | | | |
| | $d_6 = 0.7500$ | | |

-continued

Embodiment 6
$f = 68.2$ mm, F/7.3, $2\omega = 35.1°$
magnification 2.0

| | | | |
|---|---|---|---|
| $r_7 = \infty$ (stop) | | | |
| | $d_7 = 1.0000$ | | |
| $r_8 = -49.6685$ | | | |
| | $d_8 = 2.1150$ (graded refractive index lens 1) | | |
| $r_9 = -14.7979$ | | | |
| | $d_9 = 2.7775$ | | |
| $r_{10} = -8.3704$ | | | |
| | $d_{10} = 2.6573$ (graded refractive index lens 2) | | |
| $r_{11} = -11.6991$ | | | | graded refractive index lens 1

| | $n_0$ | $n_1$ |
|---|---|---|
| d-line | 1.68526, | $0.36570 \times 10^{-2}$ |
| C-line | 1.68159, | $0.36326 \times 10^{-2}$ |
| F-line | 1.69383, | $0.37139 \times 10^{-2}$ |
| | $n_2$ | $n_3$ |
| d-line | $0.13247 \times 10^{-4}$, | $-0.25939 \times 10^{-6}$ |
| C-line | $0.13346 \times 10^{-4}$, | $-0.25955 \times 10^{-6}$ |
| F-line | $0.13015 \times 10^{-4}$, | $-0.25903 \times 10^{-6}$ | graded refractive index lens 2

| | $n_0$ | $n_1$ |
|---|---|---|
| d-line | 1.65000, | $0.43621 \times 10^{-2}$ |
| C-line | 1.64426, | $0.43592 \times 10^{-2}$ |
| F-line | 1.66338, | $0.43689 \times 10^{-2}$ |
| | $n_2$ | $n_3$ |
| d-line | $0.73007 \times 10^{-5}$, | $0.49114 \times 10^{-7}$ |
| C-line | $0.72277 \times 10^{-5}$, | $0.48746 \times 10^{-7}$ |
| F-line | $0.74710 \times 10^{-5}$, | $0.49973 \times 10^{-7}$ |

$\phi_M/\phi_2 = 5.94 \times 10^{-1}$, $\quad r_{F(2)}/r_{R(2)} = 7.15 \times 10^{-1}$
$f^2 \cdot n_{1(2)} = 9.7787$

Embodiment 7
$f = 68.5$ mm, F/7.4, $2\omega = 35.0°$
magnification 2.0

| | | | |
|---|---|---|---|
| $r_1 = 10.3582$ | | | |
| | $d_1 = 4.2851$ | $n_{01} = 1.73400$ | $\nu_{01} = 51.49$ |
| $r_2 = 26.3877$ | | | |
| | $d_2 = 0.6518$ | | |
| $r_3 = -36.6775$ | | | |
| | $d_3 = 0.8023$ | $n_{02} = 1.68893$ | $\nu_{02} = 31.08$ |
| $r_4 = 11.0858$ | | | |
| | $d_4 = 1.4045$ | | |
| $r_5 = 39.2241$ | | | |
| | $d_5 = 1.5043$ | $n_{03} = 1.79952$ | $\nu_{03} = 42.24$ |
| $r_6 = -22.3834$ | | | |
| | $d_6 = 0.8023$ | | |
| $r_7 = \infty$ (stop) | | | |
| | $d_7 = 1.0465$ | | |
| $r_8 = -21.2864$ | | | |
| | $d_8 = 1.5001$ (graded refractive index lens 1) | | |
| $r_9 = -12.6778$ | | | |
| | $d_9 = 3.2653$ | | |
| $r_{10} = -10.0587$ | | | |
| | $d_{10} = 2.0005$ (graded refractive index lens 2) | | |
| $r_{11} = -11.0809$ | | | | graded refractive index lens 1

| | $n_0$ | $n_1$ |
|---|---|---|
| d-line | 1.62364, | $0.20928 \times 10^{-2}$ |
| C-line | 1.62062, | $0.20598 \times 10^{-2}$ |
| F-line | 1.63068, | $0.21699 \times 10^{-2}$ |
| | $n_2$ | $n_3$ |
| d-line | $0.12598 \times 10^{-4}$, | $0.91533 \times 10^{-7}$ |
| C-line | $0.12617 \times 10^{-4}$, | $0.91625 \times 10^{-7}$ |
| F-line | $0.12554 \times 10^{-4}$, | $0.91319 \times 10^{-7}$ | graded refractive index lens 2

| | $n_0$ | $n_1$ |
|---|---|---|
| d-line | 1.62364, | $0.89354 \times 10^{-2}$ |
| C-line | 1.61829, | $0.89220 \times 10^{-2}$ |
| F-line | 1.63611, | $0.89667 \times 10^{-2}$ |
| | $n_2$ | $n_3$ |
| d-line | $0.36528 \times 10^{-4}$, | $0.17731 \times 10^{-6}$ |
| C-line | $0.36406 \times 10^{-4}$, | $0.17704 \times 10^{-6}$ |
| F-line | $0.36812 \times 10^{-4}$, | $0.17793 \times 10^{-6}$ |

$\phi_M/\phi_2 = 9.41 \times 10^{-1}$, $\quad r_{F(2)}/r_{R(2)} = 9.08 \times 10^{-1}$ -continued

Embodiment 7
f = 68.5 mm, F/7.4, 2ω = 35.0°
magnification 2.0

$f^2 \cdot n_{1(2)} = 17.5982$

Embodiment 8
f = 57.6 mm, F/6.2, 2ω = 41.1°
magnification 1.7

$r_1 = 10.3582$
$\quad d_1 = 4.2851 \quad n_{01} = 1.73400 \quad \nu_{01} = 51.49$
$r_2 = 26.3877$
$\quad d_2 = 0.6518$
$r_3 = -36.6775$
$\quad d_3 = 0.8023 \quad n_{02} = 1.68893 \quad \nu_{02} = 31.08$
$r_4 = 11.0858$
$\quad d_4 = 1.4045$
$r_5 = 39.2241$
$\quad d_5 = 1.5043 \quad n_{03} = 1.79952 \quad \nu_{03} = 42.24$
$r_6 = -22.3834$
$\quad d_6 = 0.8023$
$r_7 = \infty$ (stop)
$\quad d_7 = 1.1485$
$r_8 = -15.9198$
$\quad d_8 = 1.3135 \quad n_{04} = 1.48749 \quad \nu_{04} = 70.20$
$r_9 = -11.1966$
$\quad d_9 = 3.2654$
$r_{10} = -10.4908$
$\quad d_{10} = 1.8346$ (graded refractive index lens)
$r_{11} = -11.0866$ graded refractive index lens

| | $n_0$ | $n_1$ |
|---|---|---|
| d-line | 1.62364, | $0.89131 \times 10^{-2}$ |
| C-line | 1.61829, | $0.88738 \times 10^{-2}$ |
| F-line | 1.63611, | $0.90049 \times 10^{-2}$ |
| | $n_2$ | $n_3$ |
| d-line | $0.36662 \times 10^{-4}$, | $0.18429 \times 10^{-6}$ |
| C-line | $0.37212 \times 10^{-4}$, | $0.18411 \times 10^{-6}$ |
| F-line | $0.35379 \times 10^{-4}$, | $0.18472 \times 10^{-6}$ |

$\phi_M/\phi_2 = 1.02, \quad r_{F(2)}/r_{R(2)} = 9.46 \times 10^{-1}$
$f^2 \cdot n_{1(2)} = 26.6483$ wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_{01}, n_{02}, \ldots$ denote refractive indices of the respective lens elements, and the reference symbols $\nu_{01}, \nu_{02}, \ldots$ represent Abbe's numbers of the respective lens elements.

The Embodinents 1 through 5 have the compositions illustrated in FIG. 1 through FIG. 5 respectively wherein the rear converter lens system according to the present invention is attached to a master lens system. That is to say, the lens surfaces $r_1$ through $r_{20}$ are comprised in the master lens system. The master lens system has a focal length of 300 mm and an F number of 2.8, whereas the rear converter lens systems are designed for a magnification level of 1.4×.

The Embodiment 1 comprises, in the order from the object side, a first lens component designed as a cemented doublet consisting of a negative meniscus lens element having a convex surface on the object side and a biconvex lens element, and a second lens component designed as a cemented doublet consisting of a biconcave lens element and a biconvex lens element. The convex lens element arranged on the image side in the second lens component is designed as a radial GRIN lens element. The Embodiment 1 is composed of the four lens elements in contrast to the conventional rear converter lens system which is designed for the specifications similar to those of the lens system according to the present invention and composed ordinarily of five lens elements. In the Embodiment 1, the number of the lens elements is reduced without aggravating Petzval's sum by imparting the negative refractive power to the medium of the radial GRIN lens element and the offaxial aberrations are corrected favorably by the refraction of the incident light due to the refractive index distribution formed on the lens surface.

The Embodiment 2 comprises a first lens component consisting only of a single biconvex lens element, and a second lens component designed as a cemented doublet consisting of a biconcave lens element and a biconvex lens element, i.e. three lens elements in total including a radial GRIN lens element used as the biconvex lens element arranged on the image side in the second lens component.

In the Embodiment 2 wherein the first lens component consists of a single biconvex lens element, undercorrected spherical aberration and coma are produced by the image side surface of the biconvex lens element, and these aberrations cannot be corrected sufficiently by the lens surfaces only. Further, since the negative refractive power is imparted to the radial GRIN lens element, the refraction of the incident light due to the refractive index distribution formed on the lens surface also undercorrects the spherical aberration and coma, thereby making it impossible to correct these aberrations without using an adequate means. For this reason, the radial GRIN lens element is so designed as to be thick enough to produce remarkable positive spherical aberration and coma which can cancel the undercorrected spherical aberration and coma.

The Embodiment 3 comprises, in the order from the object side, a first lens component designed as a cemented doublet consisting of a biconcave lens element having a nearly plane surface on the object side and a biconvex lens element, and a second lens component consisting only of a single negative meniscus lens element. The negative meniscus lens element arranged in the second lens component is designed as a radial GRIN lens element.

In the Embodiment 3, undercorrected spherical aberration and coma are produced by the first lens component as in the case of the Embodiment 2. These spherical aberration and coma are cancelled by the positive spherical aberration and coma produced by the refraction of the incident light due to the refractive index distribution which is formed on the object side surface of the radial GRIN lens element arranged in the second lens component by designing said surface so as to be concave on the object side. The Embodiment 3 is a compacter rear converter lens system since the correction of the aberrations is less dependent on the medium of the radial GRIN lens element and the second lens component (the radial GRIN lens element) need not be so thick as that used in the Embodiment 2.

The Embodiment 4 comprises, in the order from the object side, a first lens component consisting of a single biconvex lens element having a nearly plane surface on the object side, and a second lens component consisting of a single meniscus lens element which has the shape of a positive lens element having a concave surface on the object side but negative refractive power as a whole, both the lens component being designed as radial GRIN lens elements.

The Embodiment 4 uses the two radial GRIN lens elements to share the negative refractive power between the media of the two radial GRIN lens elements. As s result, Petzval's sum and chromatic aberration are corrected favorably with relatively low refractive index gradients on the surfaces of both the radial GRIN lens elements.

The Embodiment 5 comprises, in the order from the object side, a first lens component consisting of a single positive meniscus lens element having a convex surface on the image side, and a second lens component consisting of a single negative meniscus lens element which has the shape of a positive lens element having a concave surface on the object side but negative refractive power, the meniscus lens element used as the second lens component being designed as a radial GRIN lens element.

The Embodiment 5 has the composition similar to that of the Embodiment 4 but comprises a single radial GRIN lens element. This radial GRIN lens element has a high refractive index gradient to make up for insufficiency of the negative refractive power. Like the Embodiments 2 and 3 described above, the Embodiment 5 is designed in such a manner that the undercorrected spherical aberration and coma produced by the image side surface of the first lens component are cancelled with the positive spherical aberration and coma which are produced by the refraction of the incident light due to the refractive index distribution formed on the object side surface of the second lens component and the medium of the radial GRIN lens element.

When the lens system having the composition of the Embodiment 5 is to be used as a rear converter lens system in an optical system for single lens reflex cameras, it is desirable that the refractive index distribution coefficient $n_1$ for the radial GRIN lens element used as the second lens component satisfies the following condition (6):

$$n_{1(2)} < 0.5 \times 10^{-2} \{1/(mm)^2\} \quad (6)$$

The lens elements arranged in the rear converter lens system for single lens reflex cameras have effective diameters larger than those of the lens elements arranged in the rear converter lens system for lens shutter cameras. If the upper limit of the condition (6) is exceeded, the radial GRIN lens element will have too high a refractive index gradient and can hardly be manufactured in practice.

Figure 6:
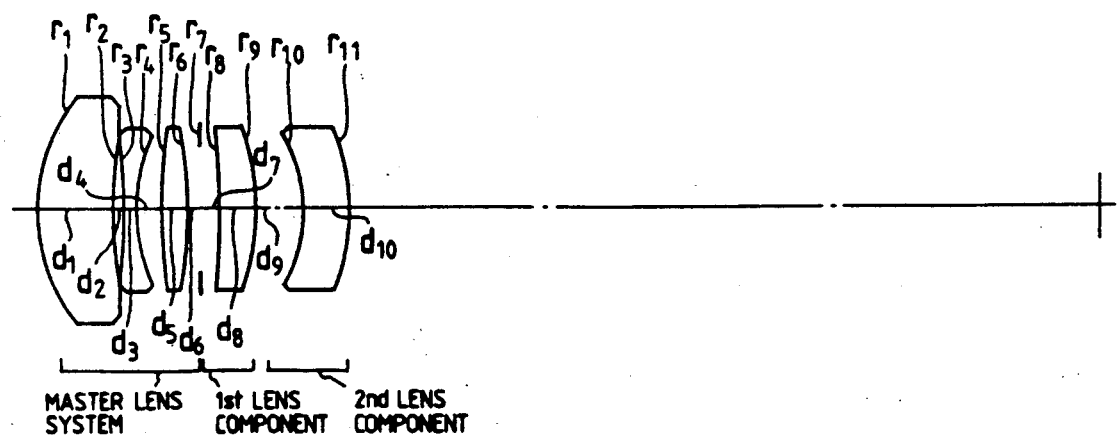
Figure 7:
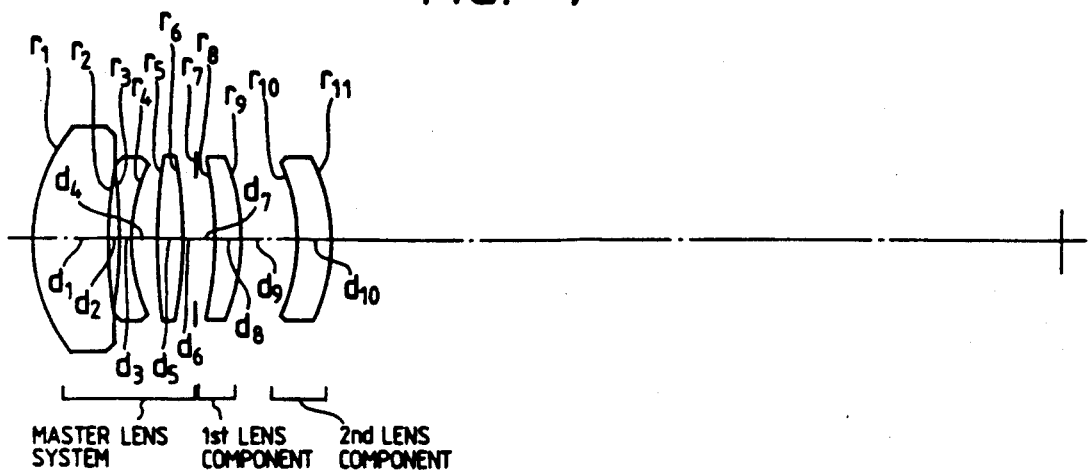
Figure 8:
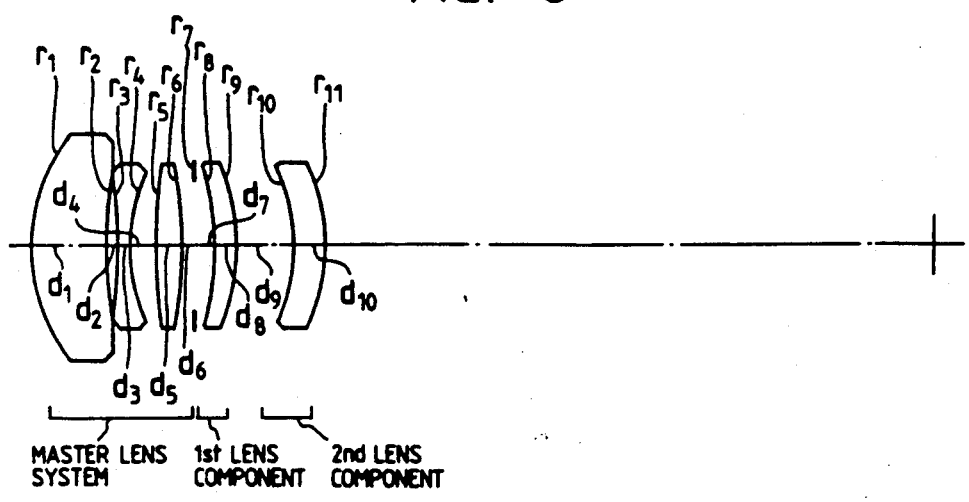
Figure 9:
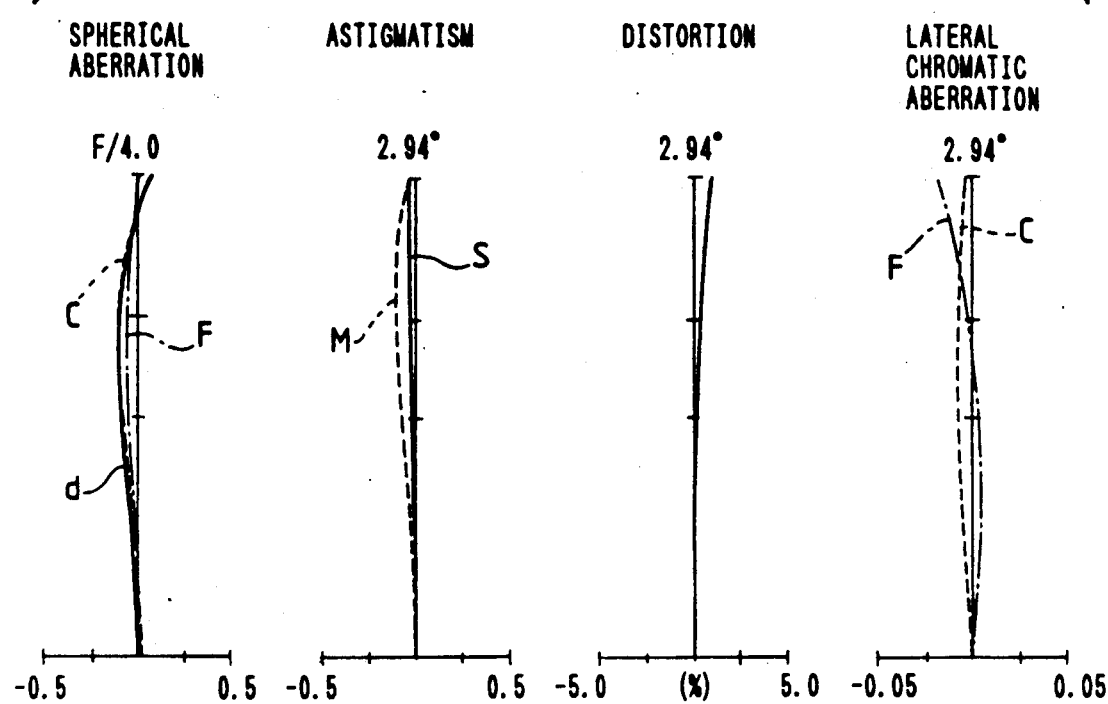
Figure 10:
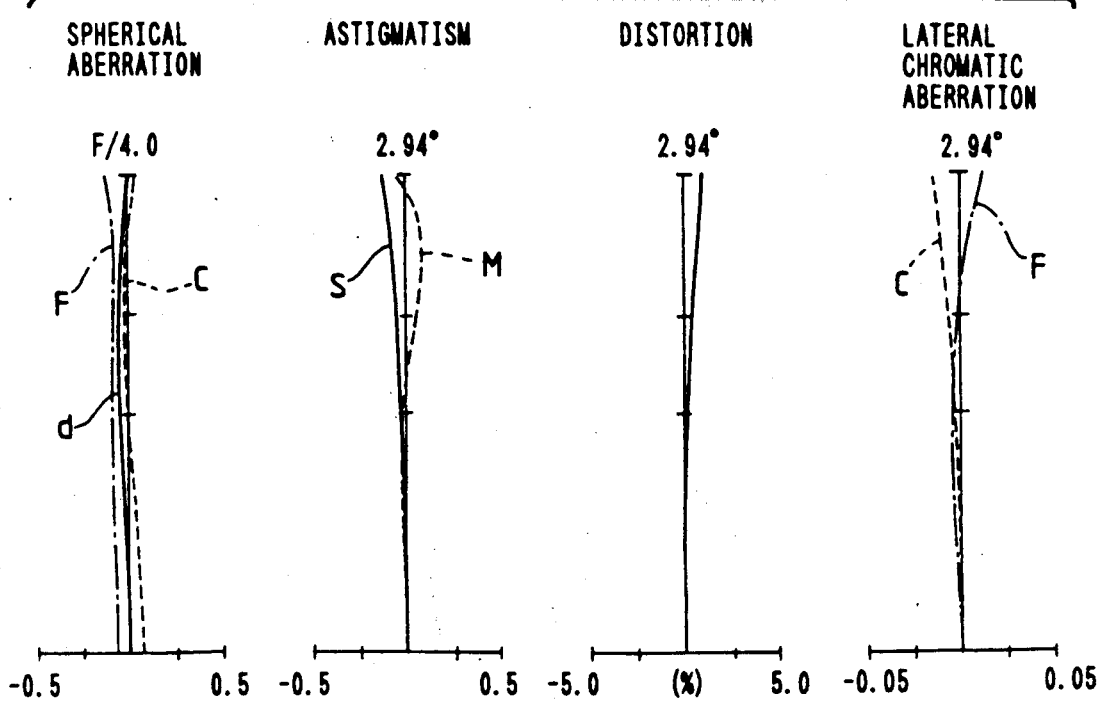
Figure 13:
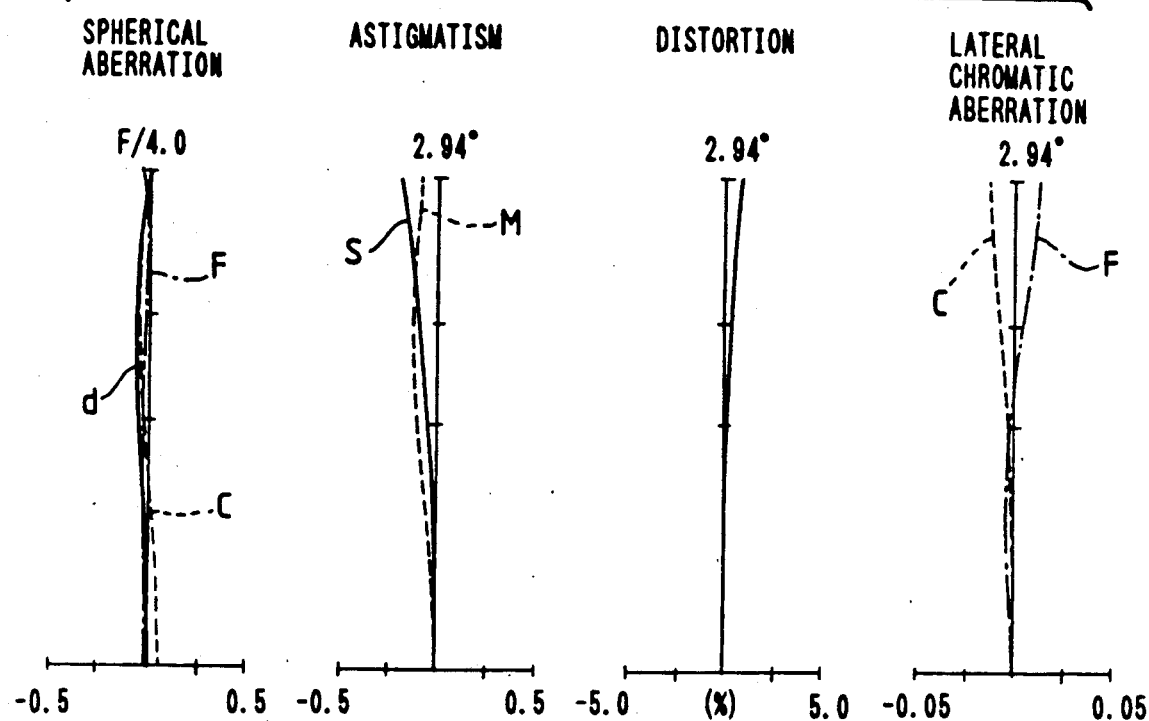
Figure 14:
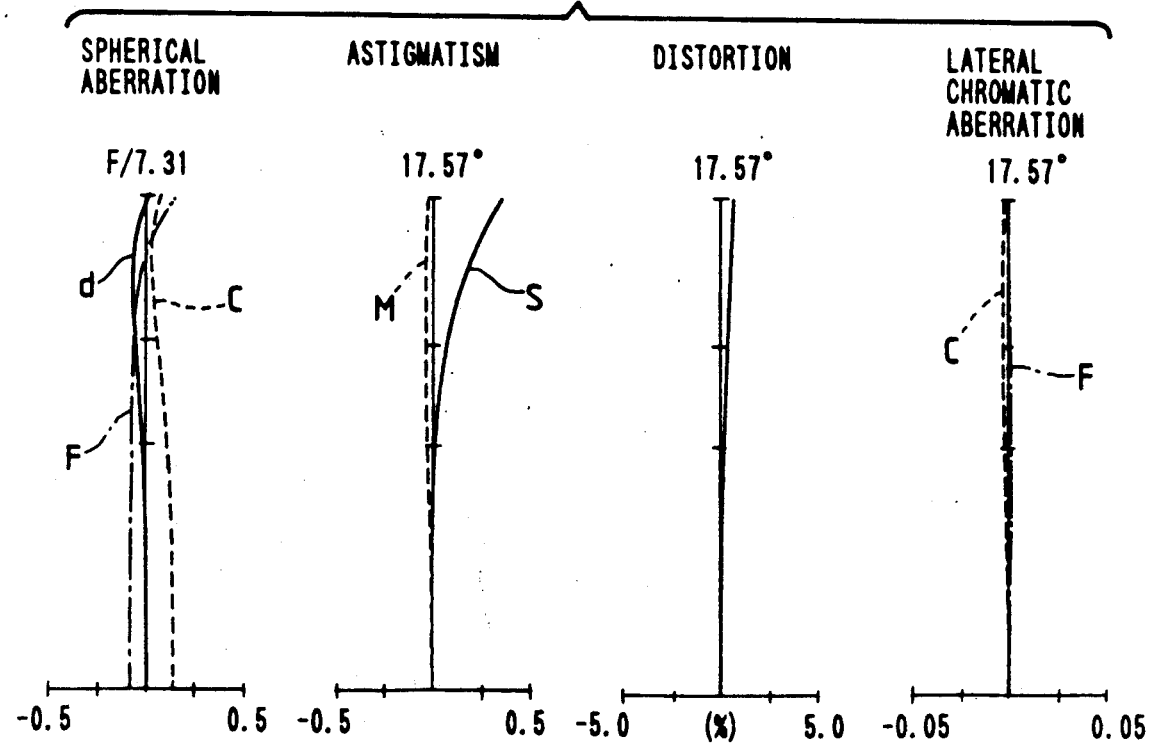

The Embodiments 6 through 8 are rear converter lens systems for lens shutter cameras and have the compositions illustrated in FIG. 6 through FIG. 8 respectively wherein a master lens system comprises the, surfaces $r_1$ through $r_7$, and is designed for a focal length of 34 mm and an F number of 3.6, whereas the rear converter lens system is designed for a magnification level of 2× in the Embodiments 6 and 7 respectively or 1.7× in the Embodiment 8.

Each of the Embodiments 6 and 7 comprises, in the order from the object side, a first lens component consisting of a single positive meniscus lens element having a convex surface on the image side and a second lens component consisting of a single negative meniscus lens element having a concave surface on the object side, both the lens components being designed as radial GRIN lens elements Each of these lens element is so adapted as to produce as little aberrations as little by utilizing the aberrations produced by the surfaces and medium thereof. Further, spherical aberration is corrected favorably in the rear converter lens system as a whole. Furthermore, the offaxial aberrations, especially coma, are corrected favorably by designing the respective lens elements in the shapes described above so as to be concentrical with regard to the stop.

The Embodiment 7 has a composition similar to that of the Embodiment 6 but adopts a refractive index gradient on the second lens component higher than that in the Embodiment 6, whereby the Embodiment 7 has a total length of the rear converter lens system shorter than that of the Embodiment 6, a telephoto ratio lower than that of the Embodiment 6 and corrects astigmatism more favorably than the Embodiment 6.

The Embodiment 8 comprises, in the order from the object side, a first lens component consisting of a single positive meniscus lens element having a convex surface on the image side and a second lens component consisting of a single negative meniscus lens element having a concave surface on the object side, the negative meniscus lens element used as the second lens component being designed as a radial GRIN lens element.

The Embodiment 8 is designed for a magnification level of 1.7×, comprises only one radial GRIN lens element and makes it rather hard to correct chromatic aberration. However, the Embodiment 8 corrects chromatic aberration favorably in the rear converter lens system as a whole by using a glass material having a large Abbe's number for the positive meniscus lens element used as the first lens component so as to minimize the chromatic aberration produced in the first lens component in itself.

Figure 17:
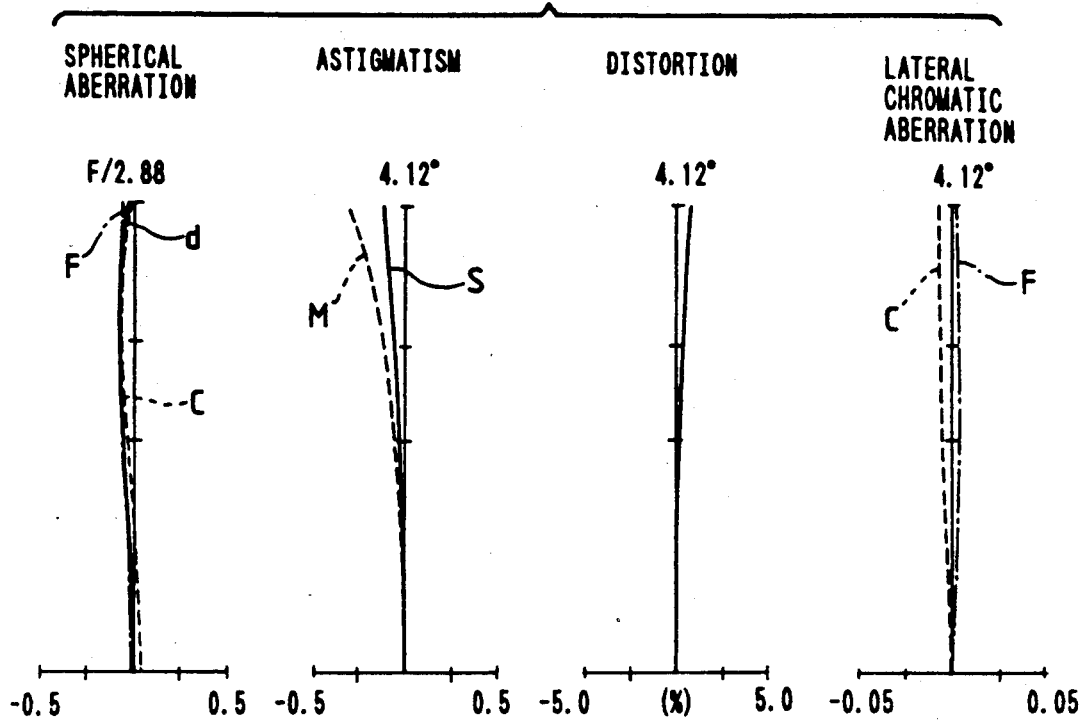
FIG. 17 shows graphs illustrating aberration characteristics of the master lens system used in the Embodiments 1 through 5 of the present invention.
Figure 18:
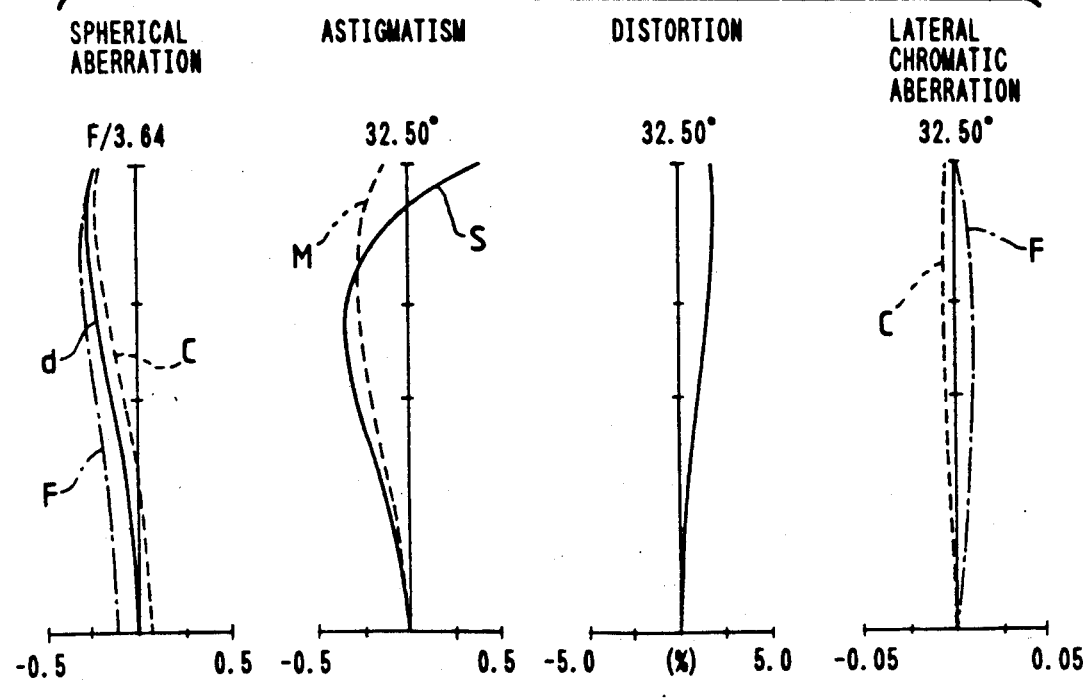
FIG. 18 shows graphs illustrating aberration characteristics of the mater lens used in the Embodiment 6 of the present invention.

Aberration characteristics of the optical systems composed by attaching the rear converter lens systems described as the Embodiments 1 through 8 to a master lens system are illustrated in FIG. 9 through FIG. 16 respectively. Aberration characteristics of the master lens system alone which is used in the Embodiments 1 through 5 are visualized in FIG. 17, whereas aberration characteristics of the master lens system alone used in the Embodiment 6 are illustrated in FIG. 18. The master lens system used in the Embodiments 6 and 7 is nearly the same as that used in the Embodinent 6 though values of the radii of curvature, thicknesses and airspaces are slightly different between the two master lens systems. Aberration characteristics of the master lens system used in the Embodiments 6 and 7 are not illustrated, but may be considered as the same as those visualized in FIG. 18.

As is understood from the foregoing description on the preferred embodiments, the rear converter lens system according to the present invention consists of a small number of lens elements and has favorably corrected aberrations, especially chromatic aberration and Petzval's sum.

We claim:

1. A rear converter lens system for disposition on the image side of a master lens system functioning independently as an imaging lens system and for varying the focal length of the master lens system, comprising:

in the order from the object side toward an image formed by said rear converter lens system, a first lens component having positive refractive power and being disposed at a foremost location in said rear converter lens system, and a second lens component having negative refractive power and being disposed on the image side of said first lens component, said rear converter lens system including at least one graded refractive index lens element.

2. A rear converter lens system according to claim 1 wherein refractive index of said graded refractive lens element is expressed by the following formula and refractive index distribution of said graded refractive index lens element satisfies the following condition (1):

$$n(r) = n_0 + n_1 r^2 + n_2 r^4 + n_3 r^6 + \ldots$$

$$0 < n_{1(2)}\{1/(mm^2)\} \quad (1)$$

wherein the reference symbol $n_{1(2)}$ represents the refractive index distribution coefficient of the second order for the d-line of the graded refractive index lens element arranged in said second lens component.

3. A rear converter lens system according to claim 2 wherein the extreme image side surface of said first lens component is convex toward the image surface, the extreme object side surface of said second lens component is concave on the object side and the extreme image side surface thereof is convex toward the image surface.

4. A rear converter lens system according to claim 3 wherein said graded refractive index lens element further satisfies the following condition (2):

$$f^2 \cdot n_{1(2)} < 75 \quad (2)$$

wherein the reference symbol f represents focal length of the rear converter lens system as a whole.

5. A rear converter lens system according to claim 3 or 4 satisfying the following conditions (3) and (4):

$$0.05 < \phi_M / \phi_2 < 3 \quad (3)$$

$$0.3 < r_{F(2)} / r_{R(2)} < 3 \quad (4)$$

wherein the reference symbol $\phi_M$ represents refractive power of the medium of said graded refractive index lens element, the reference symbol $\phi_2$ designates refractive power of said second lens component the reference symbol $r_{F(2)}$ denotes radius of curvature on the extremely object side surface of said second lens component and the reference symbol $r_{R(2)}$ represents radius of curvature on the extremely image side surface of said second lens component.

6. A rear converter lens system according to claim 5 satisfying the following condition (5):

$$n_{1C} < n_{1F}\{1/mm^2\} \quad (5)$$

wherein the reference symbols $n_{1C}$ and $n_{1F}$ represent the reflective index distribution coefficients of the second order for the C-line and the F-line respectively of said graded refractive index lens element.

7. A rear converter lens system according to claim 6 wherein said first lens component is a cemented doublet consisting of a negative meniscus lens element having a convex surface on the object side and a biconvex lens element, said second lens component is a cemented doublet consisting of a biconcave lens element and a biconvex lens element, and said biconvex lens element arranged in the second lens component is designed as a graded refractive index lens element.

8. A rear converter lens system according to claim 6 wherein said first lens component is a biconvex lens element, said second lens component is a cemented doublet consisting of a biconcave lens element and a biconvex lens element, and said biconvex lens element arranged in the second lens component is designed as a graded refractive index lens element.

9. A rear converter lens system according to claim 6 wherein said first lens component is a cemented doublet consisting of a biconvex lens element and a biconcave lens element, said second lens component is a negative meniscus lens element having a concave surface on the object side, and said negative meniscus lens element arranged in the second lens component is designed as a graded refractive index lens element.

10. A rear converter lens system according to claim 6 wherein said first lens component is a biconvex lens element, and said second lens component is a graded refractive index lens element having the shape of a positive meniscus lens element concave on the object side and negative refractive power.

11. A rear converter lens system according to claim 6 wherein said first lens component is a positive meniscus lens element having a convex surface on the image side, and said second lens component is a graded refractive index lens element having the shape of a positive meniscus lens element concave on the object side and negative refractive power.

12. A rear converter lens system according to claim 6 wherein said first lens component is a positive meniscus lens element having a convex surface on the image side, said second lens component is a negative meniscus lens element having a concave surface on the object side, and both the first and second lens component are designed as graded refractive index lens element respectively.

13. A rear converter lens system according to claim 6 wherein said first lens component is a positive meniscus lens element having a convex surface on the image side, said second lens component is a negative meniscus lens element having a concave surface on the object side, and the second lens component is designed as a graded refractive index lens element.

14. A rear converter lens system according to claim 3 wherein said first lens component is a positive meniscus lens element convex toward the image side, said second lens component is a negative meniscus lens element convex toward the image side and has refractive index distribution satisfying the following condition:

$$n_{1(2)} < 0.5 \times 10^{-2}\{1/mm^2\} \quad (6)$$

wherein the reference symbol $n_{1(2)}$ represents the refractive index distribution coefficient of the second order for the d-line of the graded refractive index lens element arranged in said second lens component.

15. A rear converter lens system consisting, as viewed from the object side, of a first lens component having positive refractive power and arranged at the foremost location, and a second lens component having negative refractive power and arranged on the image side of said first lens component, said lens system comprising at least one graded refractive index lens element, and being to be arranged on the image side of a master lens system functioning independently as an imaging lens system and to be used for varying the focal length of the master lens system.

16. A rear converter lens system according to claim 15 wherein refractive index of said graded refractive lens element is expressed by the following formula and refractive index distribution of said graded refractive index lens element satisfies the following condition (1):

$$n(r) = n_0 + n_1 r^2 + n_2 r^4 + n_3 r^6 + \ldots$$

$$0 < n_{1(2)}\{1/(mm)^2\} \quad (1)$$

wherein the reference symbol $n_{1(2)}$ represents the refractive index distribution coefficient of the second order for the d-line of the graded refractive index lens element arranged in said second lens component.

17. A lens system comprising:
- a master lens system functioning independently as an imaging lens system, and
- a rear converter lens system disposed on an image side of said master lens system for varying a focal length of said master lens system,
- said rear converter lens system including at least one graded refractive index lens element and, as viewed from an object side;
  - (a) a first lens component having positive refractive power and being disposed at a foremost location, and
  - (b) a second lens component having negative refractive power and being disposed on an image side of said first lens element.

18. A rear converter lens system according to claim 16 wherein the extreme image side surface of said first lens component is convex toward the image surface, the extreme object side surface of said second lens component is concave on the object side and the extreme image side surface thereof is convex toward the image surface.

* * * * *